US010608792B2

(12) United States Patent
Pani et al.

(10) Patent No.: US 10,608,792 B2
(45) Date of Patent: *Mar. 31, 2020

(54) GENERATING AND PROCESSING MAC-EHS PROTOCOL DATA UNITS (71) Applicant: InterDigital Technology Corporation, Wilmington, DE (US)

(72) Inventors: Diana Pani, Montreal (CA); Christopher R. Cave, Dollard-des-Ormeaux (CA); Paul Marinier, Brossard (CA); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/827,344

(22) Filed: Nov. 30, 2017

(65) Prior Publication Data
US 2018/0083742 A1    Mar. 22, 2018

Related U.S. Application Data (63) Continuation of application No. 15/205,810, filed on Jul. 8, 2016, now Pat. No. 9,843,421, which is a (Continued)

(51) Int. Cl.
*H04W 72/04* (2009.01)
*H04L 1/18* (2006.01)
(Continued)

(52) U.S. Cl.
CPC .......... *H04L 1/1887* (2013.01); *H04L 1/1812* (2013.01); *H04L 49/90* (2013.01); (Continued)

(58) Field of Classification Search
CPC ...................................................... H04B 7/00
See application file for complete search history.

(56) References Cited

U.S. PATENT DOCUMENTS 6,882,857 B2   4/2005   Zhang et al.
7,318,187 B2   1/2008   Vayanos et al.
(Continued)

FOREIGN PATENT DOCUMENTS

CN       1612617       5/2005
EP       1 317 110     6/2003
(Continued)

OTHER PUBLICATIONS

"Universal Mobile Telecommunications System (UMTS); Medium Access Control (MAC) protocol specification (3GPP TS 25.321 V7.4.0 Release 7)," ETSI TS 125 321 (Mar. 2007).
(Continued)

Primary Examiner — Sulaiman Nooristany
(74) Attorney, Agent, or Firm — Volpe and Koenig, P.C.

(57) ABSTRACT

A Node-B may prioritize a service data unit (SDU) associated with a logical channel of a priority queue that is associated with a segmentation component. A Node-B may also prioritize other SDUs associated with another priority queue associated with another segmentation component. The segmentation component may facilitate generating an enhanced high speed medium access control (MAC-ehs) reordering protocol data unit (PDU) that includes a segment of the SDU to transmit a MAC-ehs PDU on a high speed downlink shared channel (HS-DSCH).

14 Claims, 10 Drawing Sheets

Related U.S. Application Data continuation of application No. 14/213,078, filed on Mar. 14, 2014, now Pat. No. 9,392,083, which is a continuation of application No. 12/044,285, filed on Mar. 7, 2008, now Pat. No. 8,675,527.

(60) Provisional application No. 60/893,577, filed on Mar. 7, 2007.

(51) Int. Cl.
| | |
|---|---|
| *H04L 12/861* | (2013.01) |
| *H04L 29/08* | (2006.01) |
| *H04L 29/12* | (2006.01) |
| *H04W 88/08* | (2009.01) |

(52) U.S. Cl.
CPC ........ *H04L 61/6022* (2013.01); *H04L 69/324* (2013.01); *H04W 88/08* (2013.01)

(56) References Cited

U.S. PATENT DOCUMENTS

| | | |
|---|---|---|
| 7,366,122 B2 | 4/2008 | Lee et al. |
| 7,593,407 B2 | 9/2009 | Chun et al. |
| 7,675,942 B2 | 3/2010 | Lee et al. |
| 2003/0147371 A1 | 8/2003 | Choi et al. |
| 2005/0073987 A1 | 4/2005 | Wu |
| 2005/0185608 A1 | 8/2005 | Lee et al. |
| 2007/0042782 A1 | 2/2007 | Lee et al. |
| 2007/0091810 A1* | 4/2007 | Kim ............... H04L 1/1635 370/236 |
| 2008/0137564 A1 | 6/2008 | Herrmann |
| 2008/0186946 A1 | 8/2008 | Marinier et al. |
| 2008/0188220 A1 | 8/2008 | DiGirolamo et al. |
| 2008/0188224 A1 | 8/2008 | Pani et al. |
| 2009/0046626 A1 | 2/2009 | Shao et al. |
| 2009/0180387 A1 | 7/2009 | Chun et al. |
| 2009/0310534 A1 | 12/2009 | Lindskog et al. |
| 2009/0310834 A1 | 12/2009 | Jiang |
| 2010/0080170 A1 | 4/2010 | Larmo et al. |
| 2010/0172445 A1 | 7/2010 | Herrmann |

FOREIGN PATENT DOCUMENTS

| | | |
|---|---|---|
| EP | 1 748 593 | 1/2007 |
| JP | 2001-320417 | 11/2001 |
| WO | 04/042993 | 5/2004 |
| WO | 05/046086 | 5/2005 |
| WO | 05/117317 | 12/2005 |
| WO | 05/125107 | 12/2005 |
| WO | 05/125125 | 12/2005 |
| WO | 06/113829 | 10/2006 |

OTHER PUBLICATIONS

Ericsson et al., "Introduction of Improved L2 Support for High Data Rates and Enhanced CELL_FACH State," 3GPP TSG-RAN WG2 Meeting #58, R2-071875 (May 7-11, 2007).

Ericsson et al., "Introduction of Improved L2 support for high data rates and Enhanced CELL_FACH state," 3GPP TSG_RAN WG2 Meeting #58, R2-072258 (May 7-11, 2007).

Ericsson, "L2 Enhancements CR to MAC", Change Request, 25.321 CR Draft, V7.3.0, 3GPP TSG-RAN2 Meeting #57, R2-071061, (St. Louis, Feb. 12-16, 2007).

Ericsson, "L2 Enhancements: Stage 2", Change Request, 25.308 CR 0018, Rev. 1, V7.1.0, 3GPP TSG-RAN2 Meeting #57, R2-071077, (St. Louis, Feb. 12-16, 2007).

Ericsson, "Main Changes for the Improved L2 Support for High Data Rates", 3GPP TSG RAN WG2 #57, R2-070587, (St. Louis, Feb. 12-16, 2007).

Ericsson, "L2 enhancements CR to MAC," 3GPP TSG-RAN2 Meeting #57, R2-070810 (Feb. 12-16, 2007).

Ericsson, "L2 enhancements," 3GPP TSG-RAN WG2 Meeting #56bis, R2-071586 (Feb. 12-16, 2007).

LG Electronics Inc., "Discussion on TSN and reordering," 3GPP TSG-RAN WG2 #57, R2-070723 (Feb. 12-16, 2007).

Third Generation Partnership Project, "Technical Specification Group Radio Access Network; Medium Access Control (MAC) Protocol Specification (Release 7)", 3GPP TS 25.321 V7.3.0 (Dec. 2006).

Third Generation Partnership Project, "Technical Specification Group Radio Access Network; S-CCPCH Performance for MBMS; (Release 6)", 3GPP TR 25.803 V6.0.0 (Sep. 2005).

Third Generation Partnership Project, "Technical Specification Group Radio Access Network; Medium Access Control (MAC) Protocol Specification (Release 7)", 3GPP TS 25.321 V7.7.0 (Dec. 2007).

Third Generation Partnership Project, "Technical Specification Group Radio Access Network; Medium Access Control (MAC) Protocol Specification (Release 8)", 3GPP TS 25.321 V8.0.0 (Dec. 2007).

Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).

Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall description; Stage 2 (Release 7)," 3GPP TS 25.308 V7.1.0 (Dec. 2006).

Third Generation Partnership Project, "Technical Specification Group Radio Access Network; High Speed Downlink Packet Access (HSDPA); Overall description; Stage 2 (Release 6)," 3GPP TS 25.308 V6.4.0 (Mar. 2007).

Third Generation Partnership Project, "Technical Specification Group Radio Access Network; High Speed Downlink Packet Access (HSDPA); Overall description; Stage 2 (Release 7)," 3GPP TS 25.308 V7.5.0 (Dec. 2007).

Third Generation Partnership Project, "Technical Specification Group Radio Access Network; High Speed Downlink Packet Access (HSDPA); Overall description; Stage 2 (Release 8)," 3GPP TS 25.308 V8.0.0 (Dec. 2007).

Third Generation Partnership Project, "Technical Specification Group Radio Access Network; Medium Access Control (MAC) protocol specification (Release 6)," 3GPP TS 25.321 V6.11.0 (Dec. 2006).

Third Generation Partnership Project, "Technical Specification Group Radio Access Network; Medium Access Control (MAC) protocol specification (Release 5)," 3GPP TS 25.321 V5.12.0 (Sep. 2005).

Third Generation Partnership Project, "Technical Specification Group Radio Access Network; Medium Access Control (MAC) protocol specification (Release 1999)," 3GPP TS 25.321 V3.17.0 (Jun. 2004).

Third Generation Partnership Project, "Technical Specification Group Radio Access Network; Medium Access Control (MAC) protocol specification (Release 4)," 3GPP TS 25.321 V4.10.0 (Jun. 2004).

Third Generation Partnership Project, "Technical Specification Group Radio Access Network; Medium Access Control (MAC) protocol specification (Release 5)," 3GPP TS 25.321 V5.13.0 (Mar. 2007).

Third Generation Partnership Project, "Technical Specification Group Radio Access Network; Medium Access Control (MAC) protocol specification (Release 6)," 3GPP TS 25.321 V6.14.0 (Sep. 2007).

* cited by examiner

GENERATING AND PROCESSING MAC-EHS PROTOCOL DATA UNITS

CROSS REFERENCE TO RELATED APPLICATIONS

This application is a continuation of U.S. patent application Ser. No. 15/205,810 filed Jul. 8, 2016, which is a continuation of U.S. patent application Ser. No. 14/213,078 filed Mar. 14, 2014, which issued as U.S. Pat. No. 9,392,083 on Jul. 12, 2016, which is a continuation of U.S. patent application Ser. No. 12/044,285 filed Mar. 7, 2008, which issued as U.S. Pat. No. 8,675,527 on Mar. 18, 2014, which claims the benefit of U.S. provisional application No. 60/893,577 filed Mar. 7, 2007, the contents of which are hereby incorporated by reference herein.

FIELD OF INVENTION

The present invention is related to wireless communications.

BACKGROUND

High speed packet access (HSPA) evolution refers to the third generation partnership project (3GPP) radio access technology evolution of high speed downlink packet access (HSDPA) and high speed uplink packet access (HSUPA). Some of the major goals of HSPA evolution include higher data rates, higher system capacity and coverage, enhanced support for packet services, reduced latency, reduced operator costs and backward compatibility.

It has been agreed that an enhanced high speed medium access control (MAC-ehs) entity is extended to include a function for segmentation and multiplexing from different priority queues in addition to being able to receive radio link control (RLC) protocol data units (PDUs) of flexible size. The addition of new MAC-hs functionalities requires modification to the conventional MAC-hs architecture.

Figure 1:
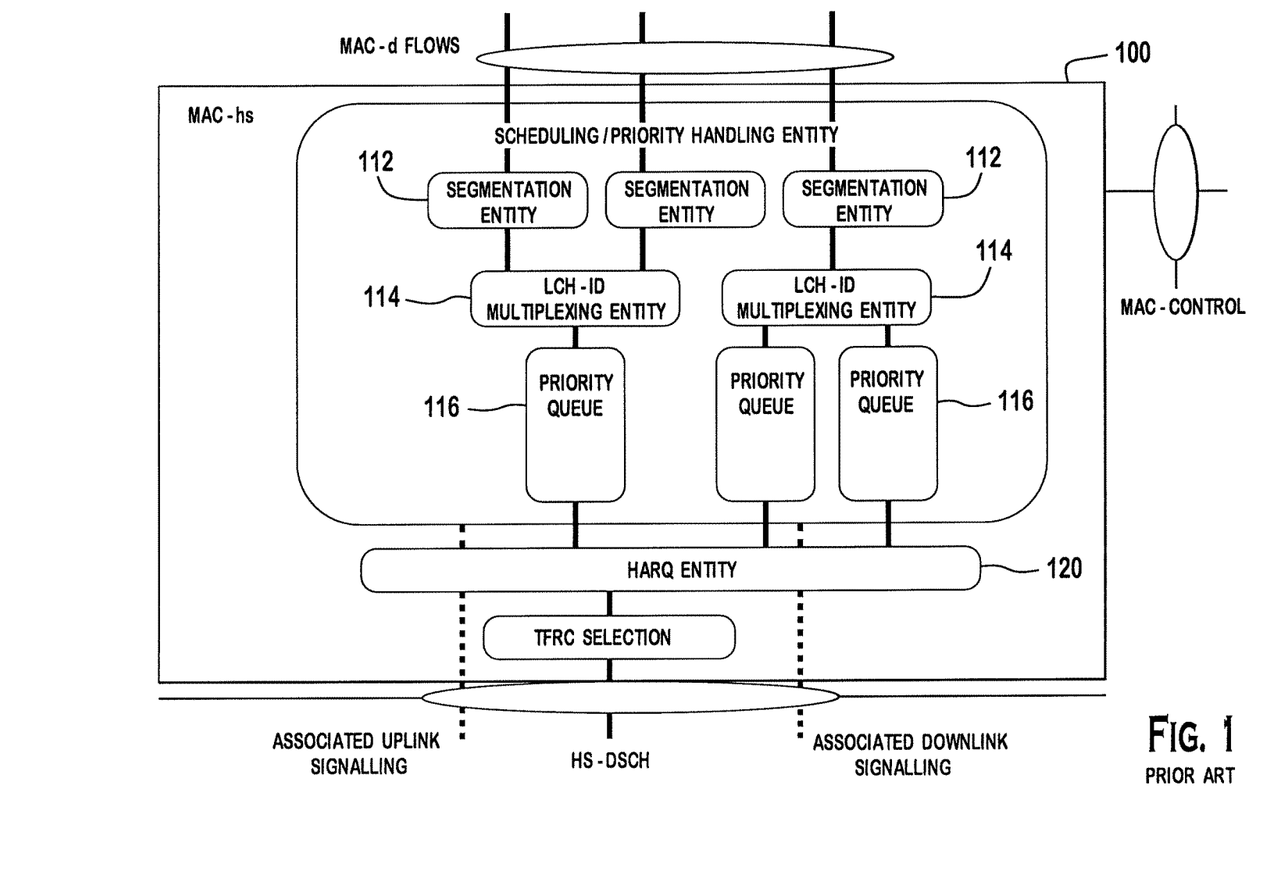
FIG. 1 shows a UTRAN-side MAC-ehs entity proposed for HSPA evolution.

FIG. 1 shows a universal terrestrial radio access network (UTRAN) side MAC-ehs entity 100 proposed for HSPA evolution. In the proposed MAC-ehs architecture, segmentation is performed per logical channel by segmentation entities 112. The segmented MAC-ehs service data units (SDUs) are then multiplexed by the logical channel identity (LCH-ID) multiplexing entities 114 based on the logical channel identity, and buffered in the configured priority queue 116. A MAC-ehs protocol data unit (PDU) is then generated from the MAC-ehs SDUs stored in the priority queue 116 and transmitted via a hybrid automatic repeat request (HARQ) entity 120.

Figure 2:
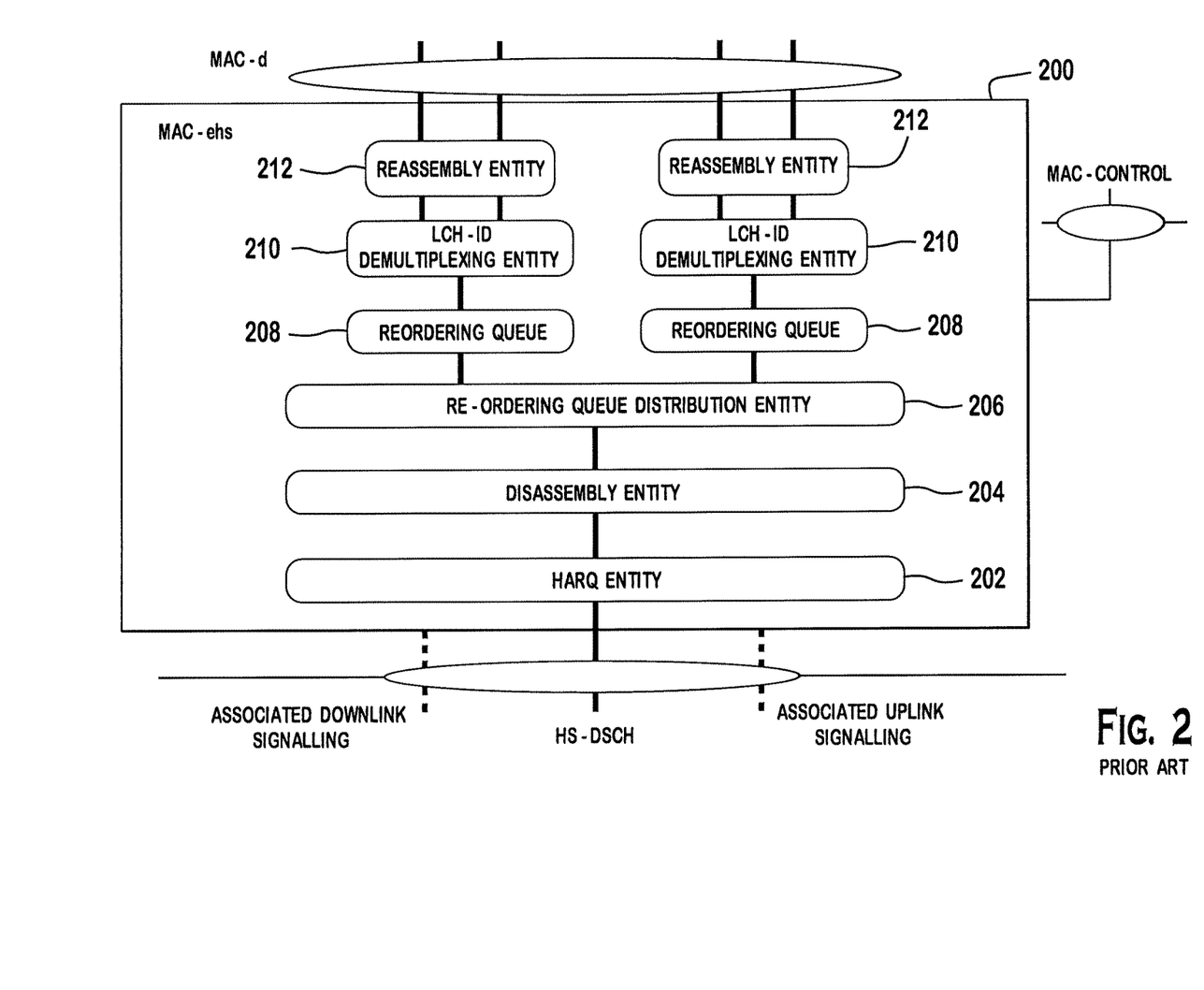
FIG. 2 shows a UE-side MAC-ehs entity proposed for HSPA evolution.

FIG. 2 shows a user equipment (UE) side MAC-ehs entity 200 proposed for HSPA evolution. The received MAC-ehs PDU via an HARQ entity 202 is disassembled into reordering PDUs by the disassembly entity 204. The reordering PDUs are distributed to a reordering queue 208 by the reordering queue distribution entity 206 based on the received logical channel identifier. The reordering PDUs are reorganized according to the transmission sequence number (TSN). Reordering PDUs with consecutive TSNs are delivered to a higher layer upon reception. A timer mechanism determines delivery of non-consecutive data blocks to higher layers. There is one reordering entity 208 for each priority class. An LCH-ID demultiplexing entity 210 routes the reordered reordering PDUs to a reassembly entity 212 based on the logical channel identifier. The reassembly entity 212 reassembles segmented MAC-ehs SDUs to original MAC-ehs SDUs and forwards the MAC-ehs SDUs to upper layers.

The proposed MAC-ehs entity 100 for the UTRAN-side performs segmentation on a per logical channel basis. However, the segmentation of the MAC-d PDUs should not be performed at that level, since the packet will not be transmitted immediately. The multiplexed reordering PDUs are buffered in the priority queue 116 and sent at a later time. Segmentation of the MAC-ehs SDUs prior to knowing the exact channel conditions is inefficient. The segmentation should not be performed prior to the time interval in which the packets will be transmitted. It would be desirable that the segmentation be performed at the time when the MAC-ehs PDU is created and the size of the transport block (TB) for that transmission time interval (TTI) is known. In addition, if the UTRAN is updated to segment the MAC-ehs SDUs right before the MAC-ehs SDUs are sent, the WTRU must also be updated accordingly.

In the proposed MAC-ehs entity 200 in FIG. 2, the LCH-ID de-multiplexing entity 210 routes the MAC-ehs segments to the reassembly entity 212 based on the logical channel identity. This requires reassembly entities for different logical channels within the same queue. In addition, if MAC-ehs headers are optimized, the system information (SI) field will not be present for every logical channel, but it will be present only for the priority queue.

SUMMARY

A method and apparatus for generating and processing a MAC-ehs PDU are disclosed. In a Node-B, MAC-ehs SDUs received from an upper layer are multiplexed based on a logical channel identity. Reordering PDUs are generated from the multiplexed MAC-ehs SDUs from different logical channels mapped to a priority queue. A reordering PDU includes at least one MAC-ehs SDU and/or at least one MAC-ehs SDU segment. A MAC-ehs SDU is segmented on a priority class basis if a MAC-ehs SDU does not fit into a reordering PDU. A MAC-ehs PDU is generated including at least one reordering PDU. The multiplexed MAC-ehs SDUs may be stored in a corresponding priority queue before generating the reordering PDUs. Alternatively, the reordering PDUs may be generated from the multiplexed MAC-ehs SDUs and the reordering PDUs may be stored in a corresponding priority queue. Alternatively, the received MAC-ehs SDUs may be buffered in a corresponding buffer for each logical channel before multiplexed based on a logical channel identity, or reordering PDUs are generated.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a UE, a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The terminology "MAC-ehs payload unit" or "payload unit" will refer to a MAC-ehs SDU or a MAC-ehs SDU segment that is inserted as a payload of a MAC-ehs PDU. The terminology "MAC-d flow" and "logical channel" are used interchangeably, and use of one term does not exclude the other. The terminology "reordering PDU" refers to one unit of a MAC-ehs PDU. The MAC-ehs PDU may include one or more reordering PDUs. The reordering PDU may include one or more payload units. The MAC-ehs SDU may be a MAC-d PDU, MAC-c/sh/m PDU, or the like.

Figure 3:
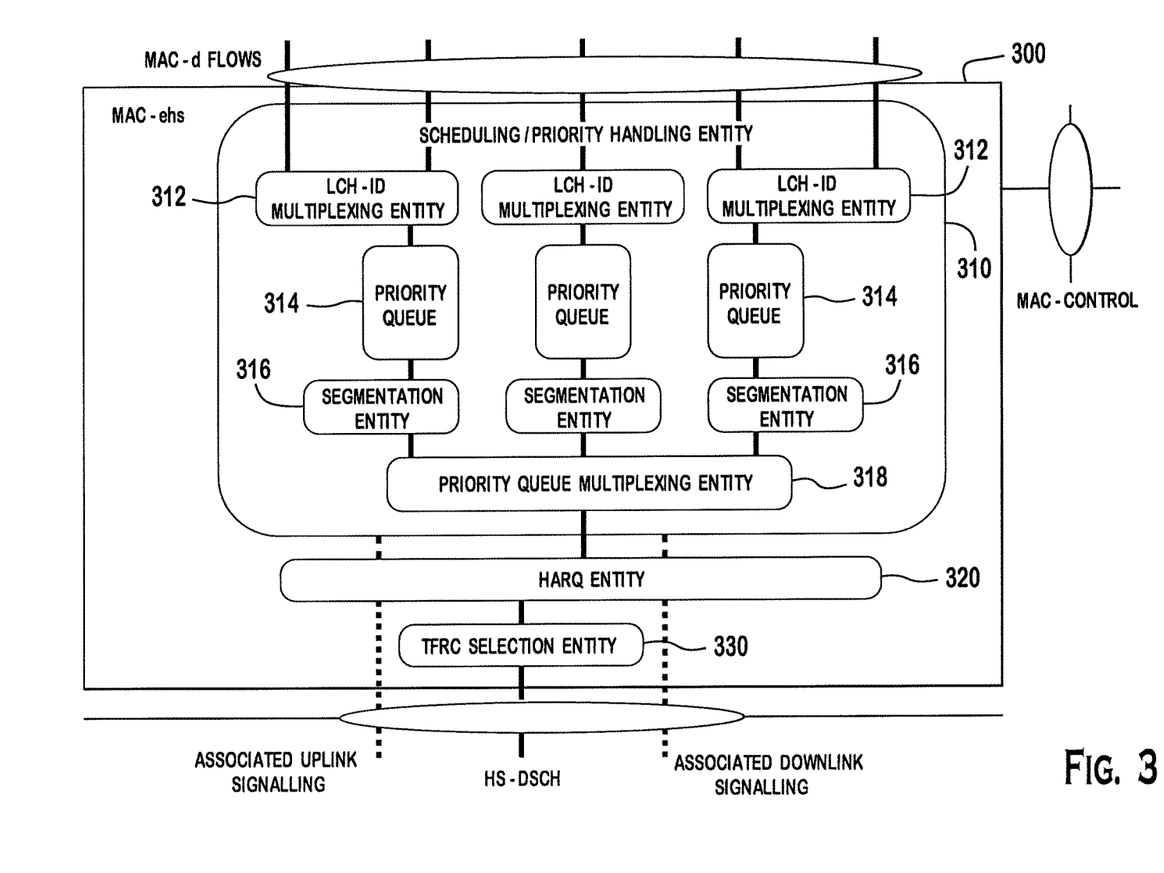
FIGS. 3-4 show a UTRAN-side MAC-ehs entity in accordance with one embodiment.

FIG. 3 shows a UTRAN-side MAC-ehs entity 300 in accordance with one embodiment. The MAC-ehs entity 300 includes a scheduling and priority handling entity 310, an HARQ entity 320, and a transport format and resource combination (TFRC) selection entity 330. The scheduling and priority handling entity 310 includes LCH-ID multiplexing entities 312, priority queues 314, segmentation entities 316, and a priority queue multiplexing entity 318. The scheduling and priority handling entity 310 manages HS-DSCH resources for data flows according to their priority class. The HARQ entity 320 handles HARQ functionality for supporting multiple instances (HARQ process) of stop and wait HARQ protocols. The TFRC selection entity 330 selects a TFRC.

The MAC-ehs entity 300 receives MAC-ehs SDUs from an upper layer, (e.g., MAC-d or MAC-c entity (not shown)). The LCH-ID multiplexing entity 312 may multiplex the MAC-ehs SDUs from multiple logical channels based on the scheduling decision and the TFRC selected by the TFRC selection entity 330 The TFRC selection entity 330 indicates to the scheduling and priority handling entity 310 the size of the MAC-ehs PDU and thus the size of data to be transmitted from each queue into a reordering PDU to be transmitted on a TTI basis. The multiplexed MAC-ehs SDUs are stored in a priority queue 314.

The segmentation entity 316 may segment the MAC-ehs SDUs per priority queue. The segmentation entity 316 segments a MAC-ehs SDU if the MAC-ehs SDU does not fit into a reordering PDU. For example, if the MAC-ehs SDU to be included in the reordering PDU is greater than the size of the reordering PDU or it causes the sum of payload units to exceed the size of the selected reordering PDU, the segmentation entity 316 segments the MAC-ehs SDU. In this case, the reordering PDU includes only one segment of the MAC-ehs SDU. The remaining segment of the MAC-ehs SDU after segmentation is stored in the segmentation entity and may be transmitted as the first payload unit in the next reordering PDU for the priority queue if the remaining segment fits into the next reordering PDU. The remaining segment of the MAC-ehs SDU is segmented again if the remaining segment still does not fit into the next reordering PDU. This may be repeated until all the parts of the MAC-ehs SDU have been transmitted. The reordering PDU will contain at most two segments, one at the beginning and one at the end, and may include zero, one, or more than one complete MAC-ehs SDUs.

The segmentation entity 316 may base its segmentation decision on the current channel condition, the given transport format and resource combination (TFRC) selection, the reordering PDU size, and the like. The segmentation is performed on a priority queue basis instead of on a per logical channel basis.

The priority queue multiplexing entity 318 may perform multiplexing of reordering PDUs in one MAC-ehs PDU. The priority queue multiplexing entity 318 selects one or more reordering PDUs from one or more priority queues 316 in order to create the MAC-ehs PDU based on the TFRC selection.

Figure 4:
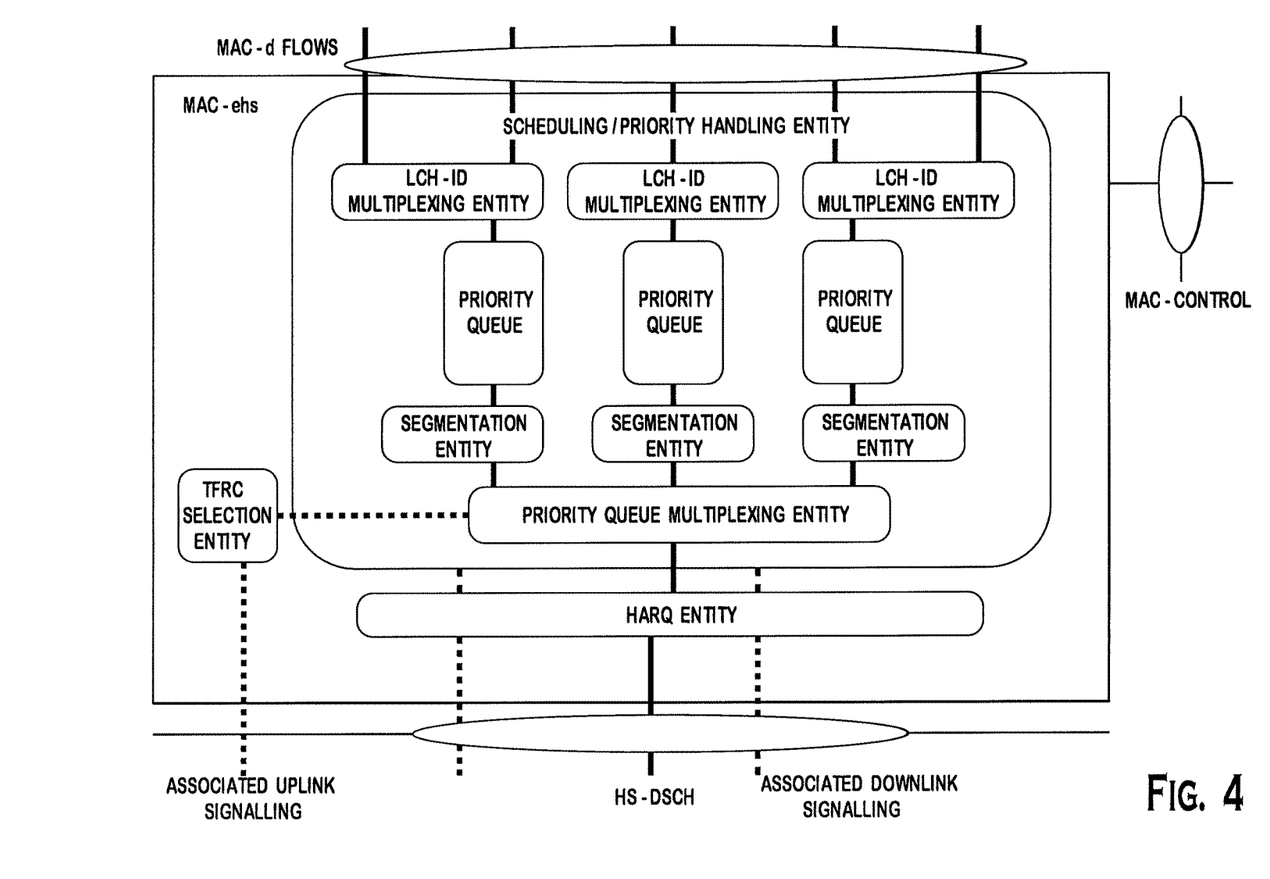

The priority queue multiplexing entity 318 may be incorporated into the HARQ entity 320. The TFRC selection entity 330 may be attached to the scheduling and priority handling entity 310, as shown in FIG. 4.

Figure 5:
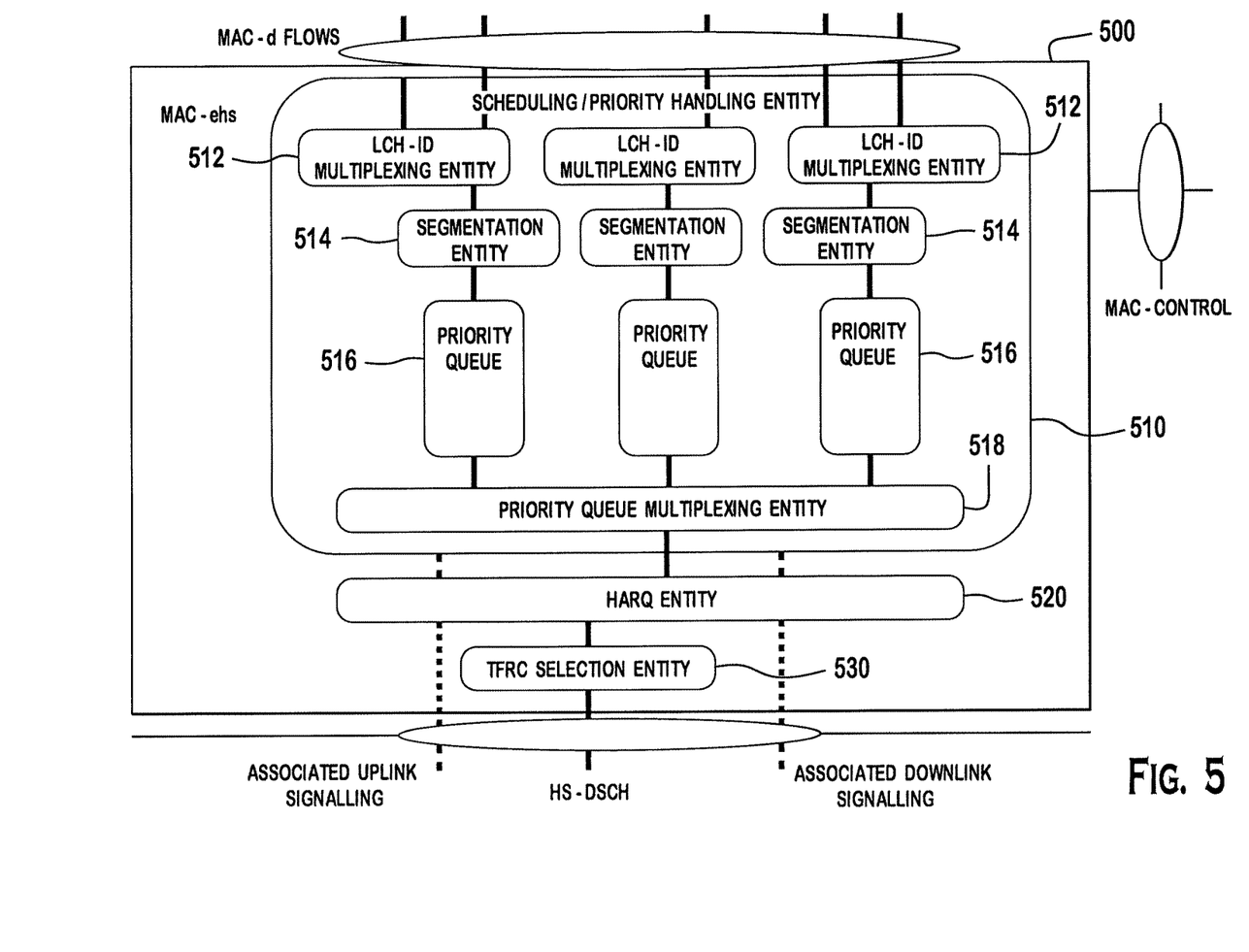
FIG. 5 shows a UTRAN-side MAC-ehs entity in accordance with another embodiment.

FIG. 5 shows a UTRAN-side MAC-ehs entity 500 in accordance with another embodiment. In this embodiment, the segmentation is performed on a priority queue basis after logical channel multiplexing. The MAC-ehs entity 500 includes a scheduling and priority handling entity 510, an HARQ entity 520, and a TFRC selection entity 530. The scheduling and priority handling entity 510 includes LCH-ID multiplexing entities 512, segmentation entities 514, priority queues 516, and a priority queue multiplexing entity 518. The scheduling and priority handling entity 510 manages HS-DSCH resources for data flows according to their priority class. The HARQ entity 520 handles HARQ functionality for supporting multiple instances (HARQ process) of stop and wait HARQ protocols. The TFRC selection entity 530 selects a TFRC.

The MAC-ehs entity 500 receives MAC-ehs SDUs from an upper layer. The LCH-ID multiplexing entity 512 may multiplex MAC-ehs SDUs from multiple logical channels based on the scheduling decision and optionally based on the TFRC selected by the TFRC selection entity 530. The TFRC selection entity 530 indicates to the scheduling and priority handling entity 510 the size of the MAC-ehs PDU to be transmitted on a TTI basis.

The MAC-ehs SDUs, after the logical channel multiplexing, may be segmented by the segmentation entity 514. The segmentation entity 514 segments a MAC-ehs SDU if the MAC-ehs SDU does not fit into a reordering PDU based on the TRFC selection. The reordering PDU contains at most two segments, one at the beginning and one at the end, and may include zero, one, or more than one MAC-ehs SDUs.

Reordering PDUs are stored in a priority queue 516. The priority queue multiplexing entity 518 may perform multiplexing of reordering PDUs in one MAC-ehs PDU. The priority queue multiplexing entity 518 selects one or more reordering PDUs from the priority queues 516 in order to create the MAC-ehs PDU.

The priority queue multiplexing entity 518 may be incorporated into the HARQ entity 520. The TFRC selection entity 530 may be attached to the scheduling and priority handling entity 510.

Figure 6:
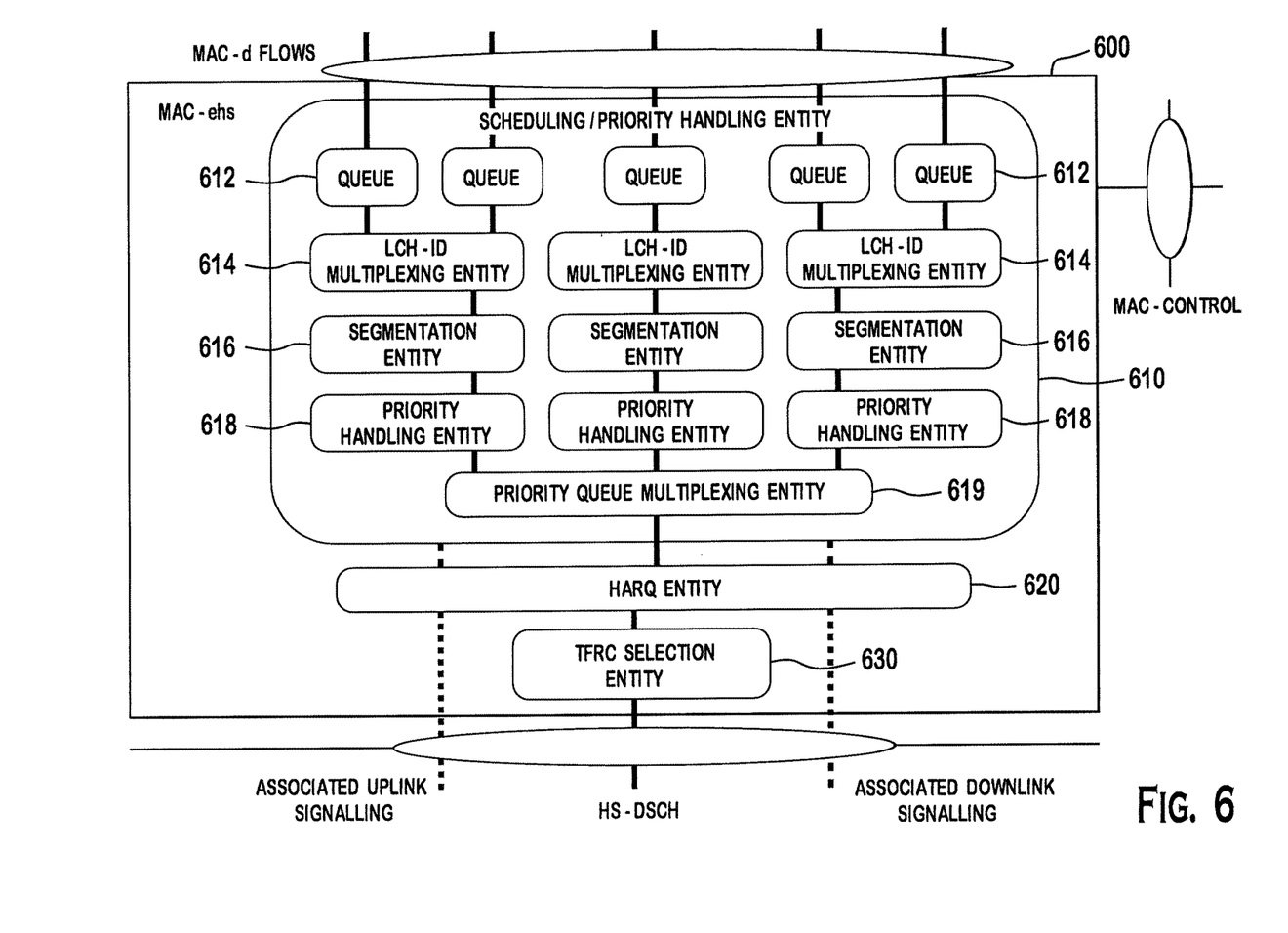
FIGS. 6-8 show a UTRAN-side MAC-ehs entity in accordance with another embodiment.

FIG. 6 shows a UTRAN-side MAC-ehs entity 600 in accordance with another embodiment. In this embodiment, the MAC-ehs SDUs are buffered per logical channel and segmentation is performed on a priority queue basis after logical channel multiplexing. The MAC-ehs entity 600 includes a scheduling and priority handling entity 610, an HARQ entity 620, and a TFRC selection entity 630. The scheduling and priority handling entity 610 includes queues 612, LCH-ID multiplexing entities 614, segmentation entities 616, priority handling entities 618, and a priority queue multiplexing entity 619. The scheduling and priority handling entity 610 manages HS-DSCH resources for data flows according to their priority class. The HARQ entity 620 handles HARQ functionality for supporting multiple instances (HARQ process) of stop and wait HARQ protocols. The TFRC selection entity 630 selects a TFRC.

The MAC-ehs entity 600 receives MAC-ehs SDUs from upper layers. MAC-ehs SDUs are stored in queues 612 on a logical channel basis. Alternatively, the queues 612 may not be present and data from different logical channels may flow directly from upper layers to the corresponding LCH-ID multiplexing entities 614. The LCH-ID multiplexing entities 614 multiplexes MAC-ehs SDUs stored in the queues 612 or received from the corresponding logical channels based on scheduling decision, scheduling priority and the TFRC selected by the TFRC selection entity 630. Based on the TFRC selection and the selected reordering PDU size, the MAC-ehs SDUs may be segmented by the segmentation entity 616. The segmentation entity 616 segments a MAC-ehs SDU if the MAC-ehs SDU does not fit into a reordering PDU. For example, if the MAC-ehs SDU to be included in the reordering PDU is greater than the size of the reordering PDU or it causes the sum of payload units to exceed the size of the reordering PDU, the segmentation entity 316 segments the MAC-ehs SDU. In this case, the reordering PDU includes only one segment of the MAC-ehs SDU. The remaining segment of the MAC-ehs SDU after segmentation is stored in the segmentation entity 616 and may be transmitted as the first payload unit in the next reordering PDU for the priority queue if the remaining segment fits into the next reordering PDU. The remaining segment of the MAC-ehs SDU is segmented again if the remaining segment still does not fit into the next reordering PDU. This may be repeated until all the parts of the MAC-ehs SDU have been transmitted. The reordering PDU contains at most two segments, one at the beginning and one at the end, and may include zero, one, or more than one MAC-ehs SDUs.

The priority handling entity 618 defines relative priorities between sets of logical channels (and/or MAC-d flows), and optionally assigns TSNs. The priority queue multiplexing entity 619 performs multiplexing of reordering PDUs in one MAC-ehs PDU.

Figure 7:
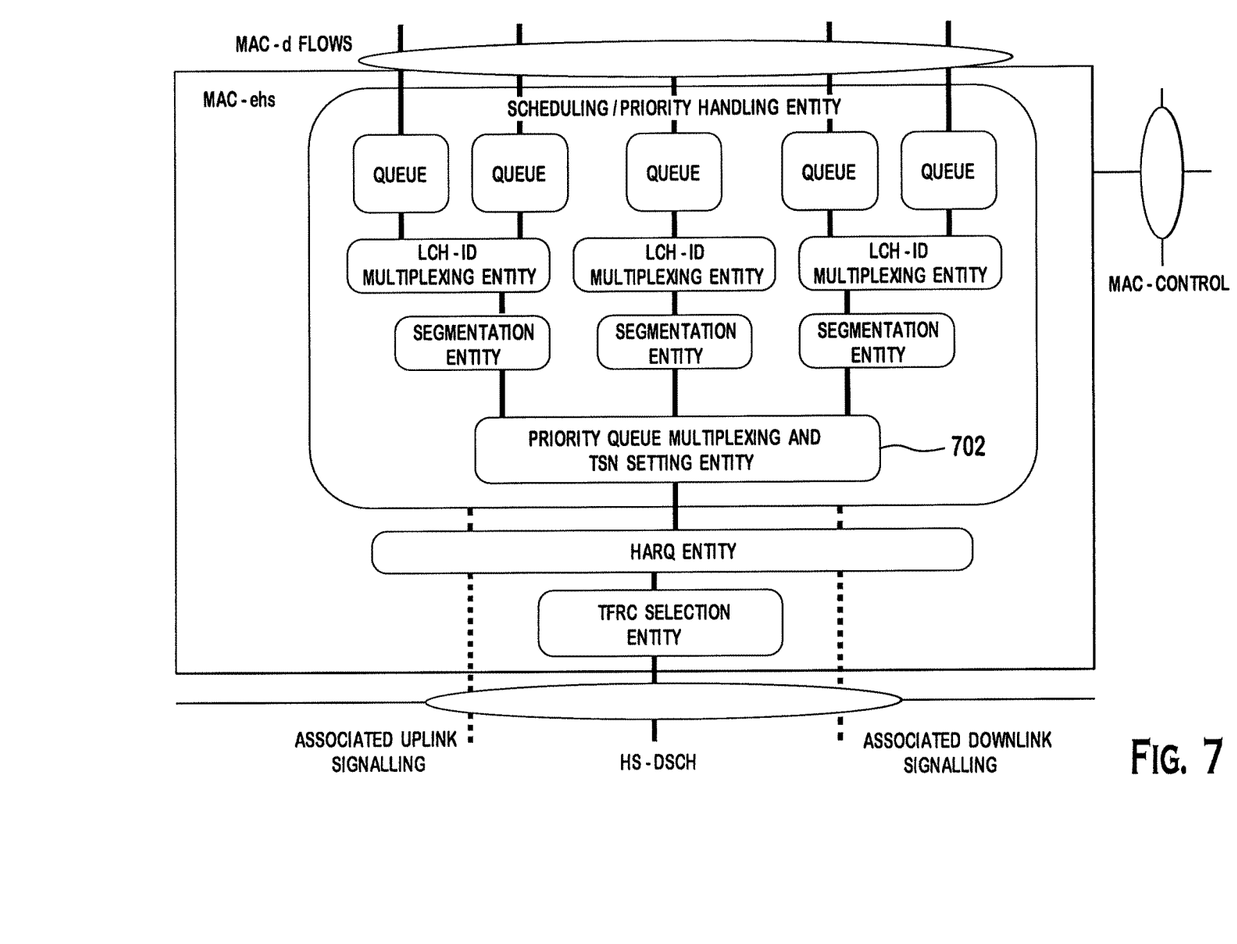
Figure 8:
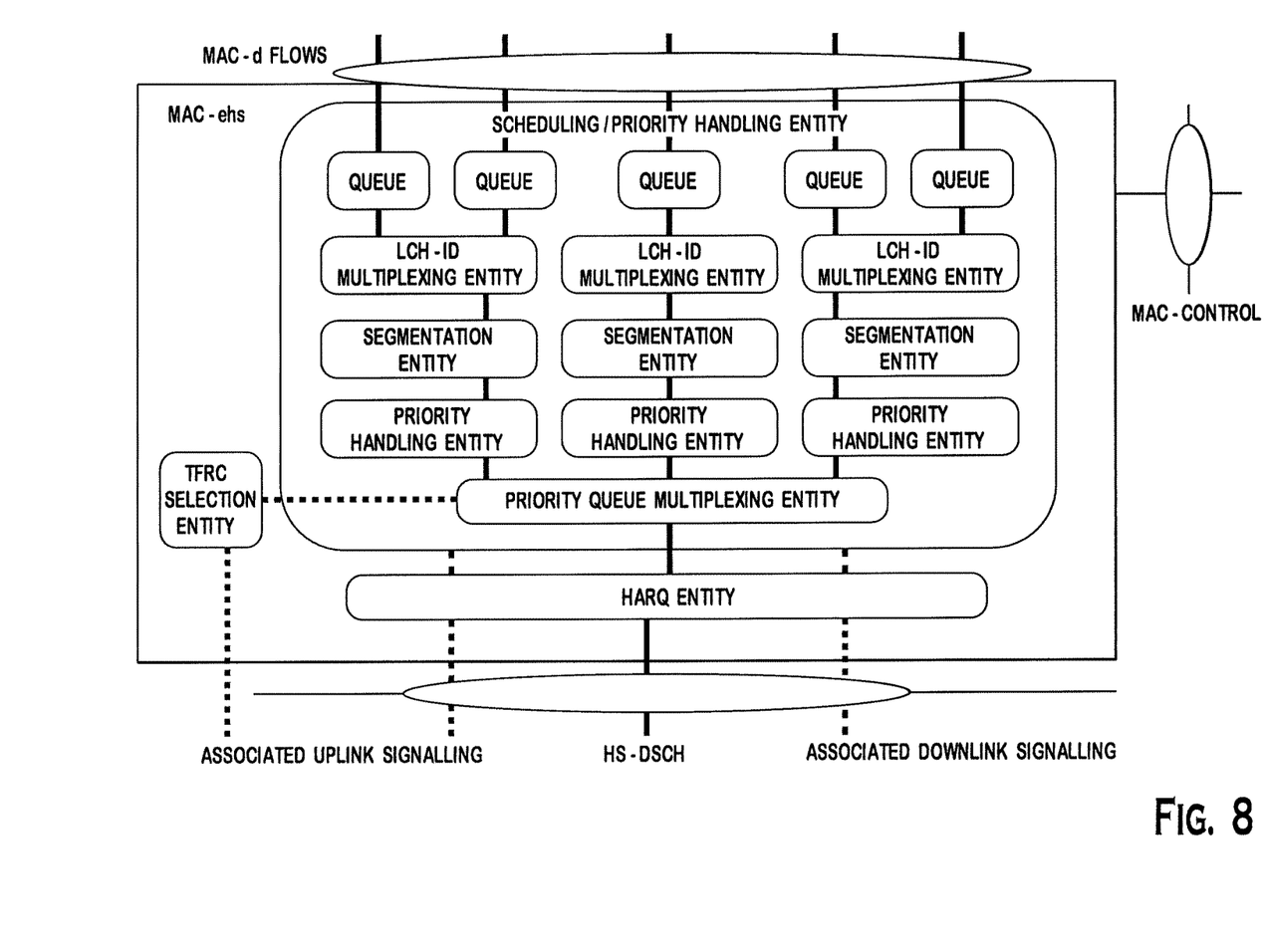

The priority handling entity 618 and its functionalities may be incorporated in the priority queue multiplexing entity 619, as shown in FIG. 7, (i.e., priority queue multiplexing and TSN setting entity 702). The segmentation entity 616 or the LCH-ID multiplexing entity 614 may be extended to buffer segments of the MAC-ehs SDUs. The TFRC selection entity 630 may be attached to the scheduling and priority handling entity 610, as shown FIG. 8.

Figure 9:
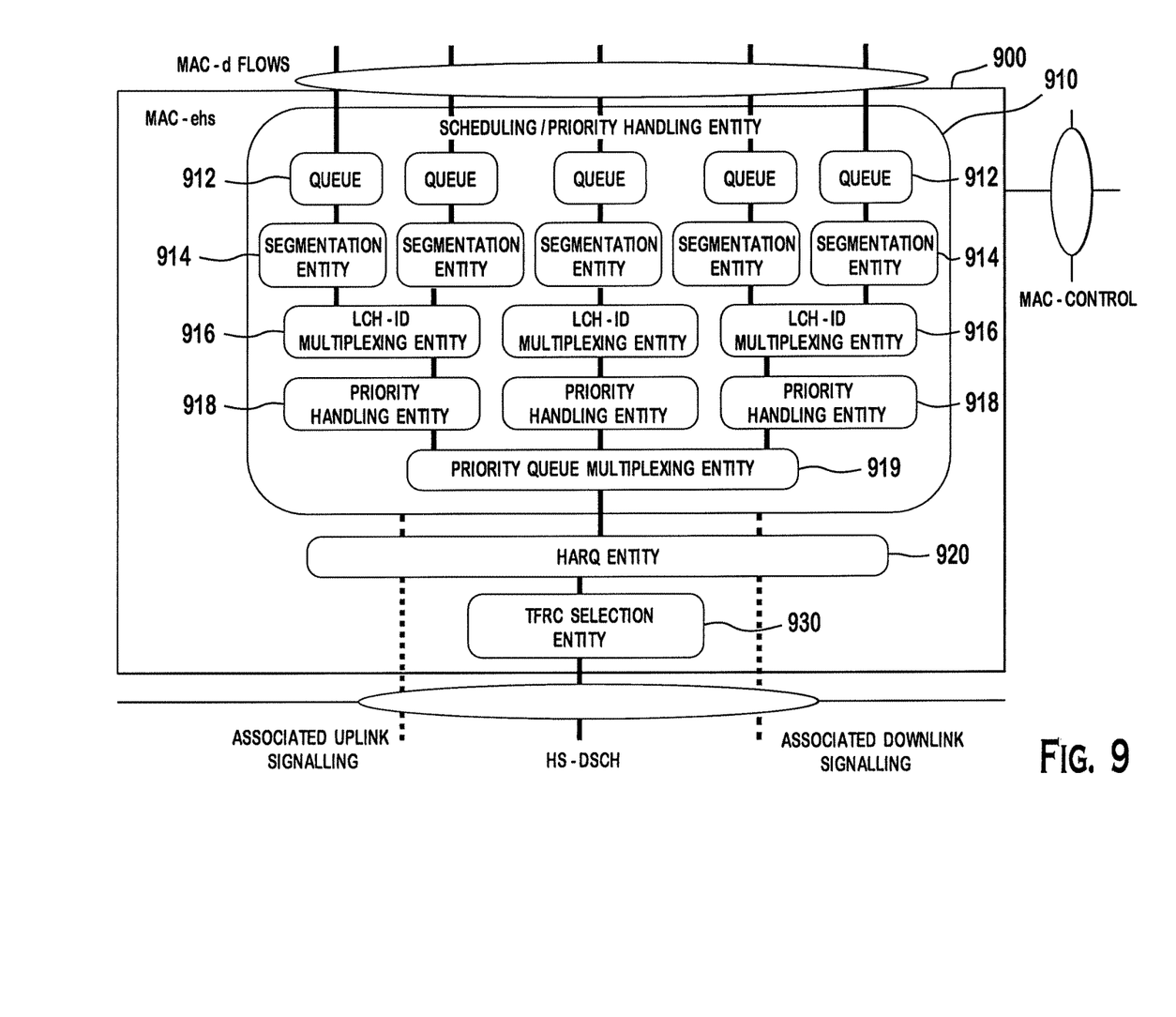
FIG. 9 shows a UTRAN-side MAC-ehs entity in accordance with another embodiment.

FIG. 9 shows a UTRAN-side MAC-ehs entity 900 in accordance with another embodiment. In this embodiment, the MAC-ehs SDUs are buffered per logical channel. Alternatively, the queues 912 may not be present and data from different logical channels may flow directly from upper layers to the corresponding segmentation entities 914. Segmentation is performed per logical channel on a TTI basis after the buffering. The MAC-ehs SDUs are buffered per logical channel rather than per priority queue. The MAC-ehs entity 900 includes a scheduling and priority handling entity 910, an HARQ entity 920, and a TFRC selection entity 930. The scheduling and priority handling entity 910 includes queues 912, segmentation entities 914, LCH-ID multiplexing entities 916, priority handing entities 918, and a priority queue multiplexing entity 919. The scheduling and priority handling entity 910 manages HS-DSCH resources for data flows according to their priority class. The HARQ entity 920 handles HARQ functionality for supporting multiple instances (HARQ process) of stop and wait HARQ protocols. The TFRC selection entity 930 selects a TFRC.

The MAC-ehs entity 900 receives MAC-ehs SDUs from upper layers. MAC-ehs SDUs from logical channels, (or MAC-d flows), are stored in queues 912 for each logical channel or alternatively are directly delivered from upper layers without any buffering. The MAC-ehs SDUs may then be segmented by the segmentation entity 914. The segmentation entity 914 segments a MAC-ehs SDU if the MAC-ehs SDU does not fit into a reordering PDU as selected by the TFRC selection. The reordering PDU contains at most two segments, one at the beginning and one at the end, and may include zero, one, or more than one MAC-ehs SDUs. The LCH-ID multiplexing entity 916 then multiplexes reordering PDUs from multiple logical channels, (i.e., multiple MAC-d flows), based on the scheduling decision and the TFRC selected by the TFRC selection entity 930.

The priority handing entity 918 defines relative priorities between sets of logical channels (and/or MAC-d flows), and optionally assigns TSNs. Alternatively, the TSNs setting may be performed per logical channel instead of per priority queue. The priority queue multiplexing entity 919 performs multiplexing of reordering PDUs in one MAC-ehs PDU. The priority handling entity and its functionality 918 may be incorporated in the priority queue multiplexing entity 919. Alternatively, the LCH-ID MUX and priority queue multiplexing may be combined in one entity and multiplexing may be performed only on one level, on a logical channel basis.

The segmentation entity 914 or the LCH-ID multiplexing entity 916 may be extended to buffer outstanding segments of the MAC-ehs SDUs. The TFRC selection entity 930 may be attached to the scheduling and priority handling entity 910.

Figure 10:
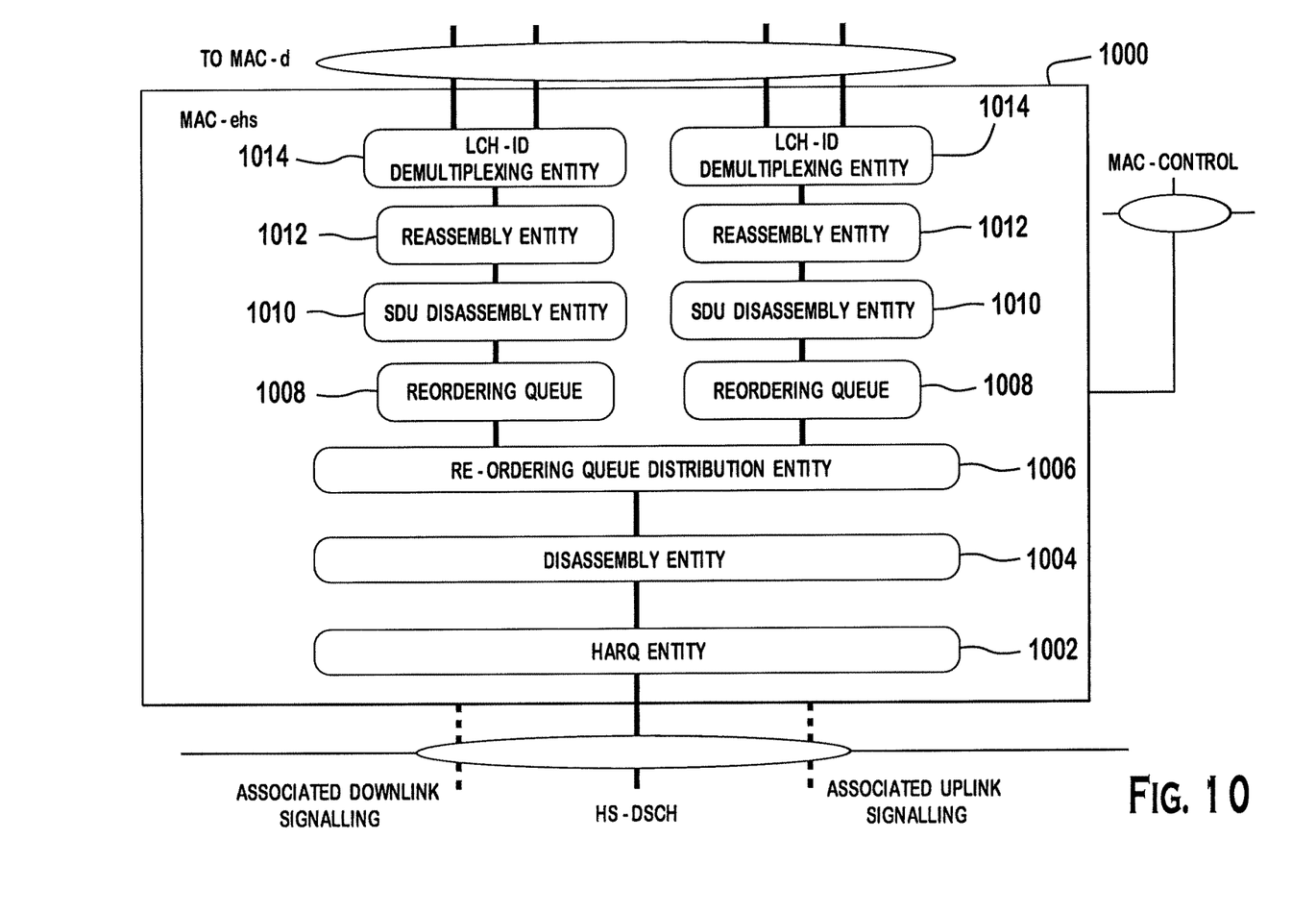
FIG. 10 shows a WTRU-side MAC-ehs entity in accordance with one embodiment.

FIG. 10 shows a WTRU-side MAC-ehs entity 1000 in accordance with one embodiment. Since in the UTRAN may perform segmentation after multiplexing logical channels in the mapped priority queue, the conventional WTRU-side MAC-ehs entity is modified to reflect these changes and to perform the reassembly and de-multiplexing in the same order. If segmentation is performed on a per priority queue basis, reassembly should be based on the reordering queue segmentation information.

The MAC-ehs entity 1000 includes an HARQ entity 1002, a disassembly entity 1004, a reordering queue distribution entity 1006, reordering queues 1008, SDU disassembly entities 1010, reassembly entities 1012, and LCH-ID demultiplexing entities 1014. The transmitted MAC-ehs PDUs are received via the HARQ entity 1002. The disassembly entity 1004 disassembles the MAC-ehs PDU to reordering PDUs. The reordering queue distribution entity 1006 distributes the reordering PDUs to an appropriate reordering queue 1008 based on the logical channel identity. The reordering PDUs are reordered at the reordering queue 1008 based on the TSN. The SDU disassembly entity 1010 disassembles MAC-ehs SDUs and segmented MAC-ehs SDUs from the reordered reordering PDUs, and delivers them to the reassembly entity 1012. The reassembly entity 1012 reassembles segmented MAC-ehs SDUs to original MAC-ehs SDUs for every reordering PDU and forwards the completed and reassembled MAC-ehs SDUs to the LCH-ID demultiplexing entity 1014. The LCH-ID demultiplexing entity 1014 routes the complete MAC-ehs SDUs to the correct logical channel, or MAC-d flow. Optionally, the SDU disassembly entity 1010 and the reassembly entity 1012 may be combined to one entity.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A network device comprising:
    a processor; and
    a transmitter;
    wherein the processor is configured:
        to prioritize, based on enhanced high speed medium access control (MAC-ehs) protocol rules, a MAC-ehs service data unit (SDU) associated with a logical channel of a first priority queue associated with a first segmentation function and MAC-ehs SDUs from other logical channels associated with the first priority queue;
        to segment, by the first segmentation function based on the MAC-ehs protocol rules, the MAC-ehs SDU for a MAC-ehs reordering protocol data unit (PDU);
        to prioritize, based on the MAC-ehs protocol rules, other MAC-ehs SDUs associated with a second priority queue that is associated with a second segmentation function; and
        to generate, based on the MAC-ehs protocol rules, a MAC-ehs PDU that includes the MAC-ehs reordering PDU; and
    the transmitter is configured to transmit the MAC-ehs PDU on a high speed downlink shared channel (HS-DSCH).

2. The network device of claim 1, wherein the generation of the MAC-ehs PDU is performed by a priority queue multiplexing entity.

3. The network device of claim 1, wherein the MAC-ehs PDU comprises a plurality of MAC-ehs reordering PDUs.

4. The network device of claim 1, wherein the MAC-ehs reordering PDU comprises a complete MAC-ehs SDU and the segment of the MAC-ehs SDU.

5. The network device of claim 1, wherein the first segmentation function segments based on any one of a current channel condition, a selected transport format and resource combination (TFRC), or a size of the MAC-ehs reordering PDU.

6. The network device of claim 1, wherein the first segmentation function facilitates generation of a first MAC-ehs reordering PDU and a second MAC-ehs reordering PDU to include in the MAC-ehs PDU.

7. The network device of claim 1, wherein the MAC-ehs PDU comprises a plurality of MAC-ehs reordering PDUs that are each associated with a different priority queue.

8. A method performed by a network device, the method comprising:
    prioritizing, based on enhanced high speed medium access control (MAC-ehs) protocol rules, a MAC-ehs service data unit (SDU) associated with a logical channel of a first priority queue associated with a first segmentation function and MAC-ehs SDUs from other logical channels associated with the first priority queue;
    segmenting, by the first segmentation function based on the MAC-ehs protocol rules, the MAC-ehs SDU for a MAC-ehs reordering protocol data unit (PDU);
    prioritizing, based on the MAC-ehs protocol rules, other MAC-ehs SDUs associated with a second priority queue that is associated with a second segmentation function;
    generating, based on the MAC-ehs protocol rules, a MAC-ehs PDU that includes the MAC-ehs reordering PDU; and
    transmitting the MAC-ehs PDU on a high speed downlink shared channel (HS-DSCH).

9. The method of claim 8, wherein the generating of the MAC-ehs PDU is performed by a priority queue multiplexing entity.

10. The method of claim 8, wherein the MAC-ehs PDU comprises a plurality of MAC-ehs reordering PDUs.

11. The method of claim 8, wherein the MAC-ehs reordering PDU comprises a complete MAC-ehs SDU and the segment of the MAC-ehs SDU.

12. The method of claim 8, wherein the first segmentation function segments based on any one of a current channel condition, a selected transport format and resource combination (TFRC), or a size of the MAC-ehs reordering PDU.

13. The method of claim 8 further comprising the first segmentation function facilitates generating a first MAC-ehs reordering PDU and a second MAC-ehs reordering PDU to include in the MAC-ehs PDU.

14. The method of claim 8, wherein the MAC-ehs PDU comprises a plurality of MAC-ehs reordering PDUs that are each associated with a different priority queue.

* * * * *